Patented Apr. 22, 1947

2,419,194

UNITED STATES PATENT OFFICE 2,419,194

PROTEIN-RESIN BONDED SHEET ABRASIVE

Allen C. Barwell, Kennett Square, Pa., assignor to Hercules Powder Company, Wilmington, Del., a corporation of Delaware No Drawing. Application October 14, 1944, Serial No. 558,725

14 Claims. (Cl. 51—301)

1

This invention relates to abrasive products and methods of manufacturing the same, and more particularly it relates to adhesive coated cellulosic sheet materials such as, for example, sandpaper and emery cloth.

It has been common practice in sandpaper and emery cloth manufacture to use ordinary animal glue as the adhesive for securing abrasive grains to the surface of a material such as paper or cloth. One difficulty with previous sheet abrasive products was that after being used for a short time they tended to "gum up." This gumming is caused by the inability of the glue coating to hold the abrasive grains intact under conditions of use. Previous glue-coated papers and cloths also suffered from lack of water resistance, since the glues which were used were either water-soluble or water-dispersible. A further disadvantage found in the use of glue-coated papers or cloths was their poor aging qualities. The latter is generally attributed to a breakdown of the glue binder itself as a consequence of bacterial action.

Now, in accordance with this invention, it has been found that improved abrasive products may be prepared from cellulosic sheet materials such as cloth or paper by coating the latter with a composition comprising a proteinaceous adhesive in conjunction with a pine wood resin containing from about 30% to about 95% petroleum hydrocarbon-insoluble material or a polyhydric alcohol ester thereof.

In the preparation of these new and improved sheet abrasive products, the pine wood resin or the polyhydric alcohol ester thereof may be emulsified in water using, for example, casein and ammonia as the emulsifying agents. To the emulsions so prepared, an aqueous solution of a proteinaceous adhesive may then be slowly added and the resulting composition applied either to paper or to cloth by any desirable means, such as by roller coating. Thereafter, abrasive grains such as garnet or emery are applied and the coating finally dried. Usually a top coating of the adhesive composition will be applied to the dried abrasive article and the drying process repeated. In some cases it may be desirable to include in the adhesive composition a small amount of a plasticizing agent.

As illustrative of the various contemplated adhesive compositions and abrasive products derived through use of said compositions several particular embodiments of the invention are given below. These, however, are in no way to be considered as limiting the invention but are merely illustrating the inventive concept which is broadly set forth in the specification and claims. All parts and percentages are by weight unless otherwise indicated.

Example 1

One hundred parts of a mixture of 50 parts of a pine wood resin having a melting point of 114° C. (Hercules drop method), an acid number of 90, and a gasoline insolubility of 85%, and 50 parts of a pine wood resin having a melting point of 86.7° C. (Hercules drop method), an acid number of 119, and a gasoline insolubility of 64% was heated to its melting point. To the resin mixture, at a temperature just above its melting point, was added a solution of 9 parts of concentrated ammonium hydroxide (28% $NH_3$) in 10 parts of water, thus producing what was essentially an ammonium soap of the resin mixture. In a separate vessel, 5 parts of acid casein was wetted with 5 parts of water and dissolved by adding one part of concentrated ammonium hydroxide. The casein solution was added to the ammonium soap of the resin mixture with thorough mixing, and the resulting composition then was diluted by the slow addition of 120 parts of water to form an emulsion of 40% solids. To 3 parts of this emulsion was slowly added with constant stirring 3 parts of an aqueous 50% hide glue solution having a density of 30° Twaddell. During the addition of the glue to the emulsion a temperature of 55° C. was maintained. The resulting adhesive composition was then applied by means of a roller coating mechanism to cloth. The cloth was that ordinarily used in the manufacture of emery cloth, being 28 inches wide and previously sized with a 10% aqueous solution of hide glue. Abrasive particles consisting of aluminum oxide of 80–100 mesh size were applied to the coated cloth and the emery cloth allowed to dry. Thereafter, a dilute solution (25% solids) of the same adhesive was applied as a top coat and the cloth again allowed to dry. The emery cloth was tested on a cold-rolled steel bar having a diameter of three inches and turning in a lathe. The adhesive held the abrasive particles satisfactorily, and the emery cloth proved better than standard emery cloths in respect to water resistance. Concerning the latter, the emery cloth of this invention stood up 50% better than standard emery cloth, which used straight glue as the adhesive, when both were used under identical moist conditions.

Example 2

One and three-quarters parts of an aqueous 50% hide glue solution was slowly added at a temperature of 55° C. and with constant stirring to 1.75 parts of the resin emulsion described in Example 1, and to the resulting adhesive composition was added 0.19 part of a 75% solution of the monoethylene glycol ester of wood rosin as a plasticizer. Using the general procedure outlined in Example 1, the adhesive was applied to cloth, and abrasive grains of 80–100 mesh aluminum oxide added. After drying, a dilute solution of the adhesive was applied as a top coat and the cloth again dried. The emery cloth was tested as in Example 1, and it was found that under both dry and moist conditions this cloth held the abrasive particles more firmly than the straight glue adhesive used in ordinary emery cloths. The cloth proved to be 30% better under dry conditions and 60% better under moist conditions than standard emery cloths.

Example 3

One hundred parts of a pine wood resin having a melting point of 114° C. (Hercules drop method), an acid number of 98, and a gasoline insolubility of 80% was powdered so as to pass through a 100-mesh screen. To the resin was added a casein solution made from 5 parts of acid casein, 6 parts of water, and 10 parts of concentrated ammonium hydroxide (28% NH₃). After mixing thoroughly the mixture was gently heated and 130 parts of water very slowly added with constant stirring to form an emulsion. The resulting emulsion had a solids content of 40%. To 3 parts of this emulsion was added at 55° C., slowly and with constant stirring, 3 parts of an aqueous 50% solution of hide glue. The adhesive composition so prepared was applied to cloth by means of a roller coating mechanism and 80–100 mesh aluminum oxide spread thereon, the coated cloth being allowed to dry. Thereafter, a top coat of the same adhesive diluted to 22% solids was applied and the final product allowed to dry. The emery cloth was tested as in Example 1 and found to have the same desirable properties of good adhesion of the abrasive particles, increased resistance to wear, and increased resistance to moisture. Furthermore, the emery cloth proved better than standard emery cloths utilizing glue as the adhesive in resistance to oils, greases, and petroleum hydrocarbons.

Example 4

The resin emulsion described in Example 3 was heated to 55° C. and applied to cloth. Aluminum oxide (80–100 mesh) was spread on the coated cloth and the entire mass allowed to dry. A top coat of the same emulsion diluted to 20% solids was then applied and the final product allowed to dry. This emery cloth on being tested was found to have essentially the same desirable qualities of that shown in Example 3, but was somewhat less flexible.

Example 5

Following the procedure used in Example 3, an emulsion was prepared from 36.4 parts of a pine wood resin having a melting point of 114° C. (Hercules drop method), an acid number of 100, and a gasoline insolubility of 82%, 3.64 parts of ammonium hydroxide (28% NH₃), 1.82 parts of casein, 3.64 parts of the ethylene glycol ester of wood rosin, and 54.50 parts of water. To the emulsion, warmed to 55° C., was slowly added an equal volume of an aqueous 50% hide glue solution. The adhesive composition so prepared was applied to paper by means of a roller coating mechanism and abrasive particles consisting of 80–100 mesh aluminum oxide spread thereon. The paper was that ordinarily used in sandpaper manufacture, being 24″ x 36″ and about 25 mils thick. After drying, a top coat was applied using the same adhesive diluted to 22% solids. After drying and flexing the sandpaper was ready for use. On testing the sandpaper was found to have excellent resistance to water, oils, greases, and petroleum hydrocarbons. The adhesive coating of this example held the abrasive particles satisfactorily and rendered the sandpaper resistant to wear.

Example 6

Following the procedure and proportions used in Example 1 a resin emulsion was prepared using a pine wood resin having a melting point of 86.7° C. (Hercules drop method), an acid number of 119, and a gasoline insolubility of 64%. To the emulsion so prepared was added at a temperature of 55° C. an equal volume of aqueous 50% animal glue. The resulting adhesive was applied to cloth, 80–100 mesh aluminum oxide spread on the coated cloth, and the entire mass allowed to dry. A top coat of the same adhesive diluted to 22% solids was then applied and the final product allowed to dry. The emery cloth was tested as in Example 1 and was found to be quite similar to the emery cloth prepared according to Example 1.

Example 7

One hundred parts of the glyceryl ester of a pine wood resin, the resin having a melting point of 115° C. (Hercules drop method), an acid number of 93, and a gasoline insolubility of 88%, was powdered so as to pass through a 100-mesh screen. Following the procedure of Example 3 an emulsion of the ester was prepared. To this emulsion, heated to 55° C., was slowly added with constant stirring an equal volume of warm (55° C.) aqueous 50% solution of hide glue. The resulting adhesive composition was spread on a piece of cloth by means of a roller coating mechanism and 80–100 mesh aluminum oxide particles added. After drying, a top coat composed of the same adhesive diluted with an equal volume of water was applied to the cloth and the final product allowed to dry. When the emery cloth was tested on a cold-rolled steel bar turning in a lathe it was found to be superior to emery cloths prepared using a straight glue coating. The abrasive particles were more firmly held, the tendency to "gum up" was less, and the cloth was more resistant to the action of water, oils, greases, petroleum hydrocarbons, and alkalies.

Example 8

Following the procedure of Example 3 a 40% solids emulsion was prepared from 100 parts of the ethylene glycol ester of a pine wood resin, the resin having a melting point of 114° C. (Hercules drop method), an acid number of 100, and a gasoline insolubility of 82%. To this emulsion at 55° C. was added slowly and with stirring an equal volume of warm (55° C.) aqueous 50% solution of hide glue. The resulting adhesive was spread on a piece of paper and 80–100 mesh aluminum oxide applied as the abrasive. After drying, a top coat consisting of a 22% solids solution of the above adhesive was applied and the final product allowed to dry. The sandpaper was tested in regard to resistance to wear, and resistance to water, alkalies, oils, greases, and petroleum hydrocarbons. In all these respects the sandpaper was definitely superior to those using a straight glue adhesive.

*Example 9*

Following the method shown in Example 1 a 40% solids emulsion was prepared from the glyceryl ester of a pine wood resin, the resin having a melting point of 89° C. (Hercules drop method), an acid number of 124, and a gasoline insolubility of 57%. This emulsion was applied at 55° C. to a piece of cloth and 80-100 mesh aluminum oxide spread thereon as the abrasive. After drying, a top coat consisting of the above emulsion diluted with an equal volume of water to produce an adhesive of 20% solids was applied and the final product allowed to dry. On testing the emery cloth it exhibited the desirable properties found in connection with the emery cloth of Example 7.

The pine wood resin which is useful in the compositions of this invention may be any portion or substantially all of that dark-colored fraction of pine wood resin which can be extracted from the wood with aromatic hydrocarbons and which is characterized by a petroleum hydrocarbon insolubility of from about 30% to about 95%.

The wood resin extract of pine wood such as is obtained by extracting pine wood with benzene consists of pale rosin, gasoline-insoluble resinous material and color bodies. Frequently such extract contains 15% or more of gasoline-insoluble resinous material. Upon the treatment of such resinous extract to separate therefrom a fraction of pale rosin there is formed one or more fractions containing the balance of the resinous material derived from the pine wood. One or more of such remaining fractions may be used as the resin material in this invention. The nonrosin portion of the pine wood extract may be separated by appropriate processes into a fraction of substantially gasoline-insoluble resinous material and a dark-colored intermediate fraction lying between the substantially gasoline-insoluble fraction and rosin. It is impossible to effect an absolutely clean separation between the gasoline-insoluble resinous material and the rosin. By the preparation of a dark-colored intermediate fraction containing some gasoline-insoluble resinous material and the color bodies, a very good separation of the pine wood extract into rosin, gasoline-insoluble resinous material, and into this intermediate fraction is effected.

As one of the pine wood resins of this invention, it is preferable to use the dark-colored intermediate fraction largely insoluble in petroleum hydrocarbons and obtained by the refining of impure wood rosin to pale grades by means of a selective solvent for color bodies such as furfural, or a selective adsorbent such as fuller's earth. Such an intermediate fraction contains at least 30% and up to about 80% by weight of a gasoline-insoluble resinous material. Still further, the other pine wood resin which may be utilized in this invention is the substantially completely gasoline-insoluble resinous material derived from pine wood and which contains at least about 80% by weight of gasoline-insoluble resinous material. Mixtures of the foregoing resinous materials may also be employed. As an example of such a mixture, a blend of the dark-colored intermediate fraction and the substantially gasoline-insoluble fraction, obtained, for example, from pine wood without separation into the individual fractions either by a process which involves leaving the rosin in the wood or by a process which involves separation of the rosin, may be used. The resin material preferably contains at least about 30% of gasoline-insoluble resinous material, varying therefrom up to about 95%.

The dark-colored fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon such as hot petroleum ether or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the coloring bodies and a larger proportion of the unsaponifiables from the original FF rosin as well as a good proportion of the rosin acids. It contains a large proportion of oxidized rosin acids and, therefore, is only partially soluble in petroleum hydrocarbon solvents at room temperature. The percentage of gasoline-insolubles varies from about 30% to about 80% by weight. It has a higher flow point, a much higher viscosity, lower acid number and a higher unsaponifiable content than FF wood rosin. However, the saponification number is not correspondingly lower, indicating, thereby, a higher ester content. In addition it is noncrystallizing. Such a fraction is characterized by the following approximate analysis:

Acid number_____ 105–140
Saponification number_____ 150–170
Melting point (Hercules drop
  method)_____ [1] 176° F.–239° F.
Unsaponifiable matter_____ 10–20%
Gasoline insoluble_____ 30–80%
Petroleum ether insoluble_____ 30–80%

[1] (80° C.–115° C.)

A typical example of such a fraction had the following analysis: acid number, 124; saponification number, 150; melting point (drop), 89° C.; gasoline-insoluble, 57%; unsaponifiable matter, 12%; Lovibond color, dark; ash content, 0.03%.

The substantially gasoline-insoluble fraction referred to above may be prepared from pine wood by the processes set forth in U. S. patents to Hall, Nos. 2,193,026 and 2,221,540. This fraction is characterized by being substantially completely insoluble in petroleum hydrocarbons such as gasoline. The gasoline-soluble portion of this fraction rarely exceeds 20% by weight. This fraction may be said to be the gasoline-insoluble resin contained in pine wood. For example, the extraction of pine wood with benzene yields a mixture of this fraction and FF rosin. Upon treatment of the resinous mixture with a mixture of gasoline and a relatively small volume of furfural the substantially gasoline-insoluble fraction goes into solution in the furfural while the FF rosin goes into solution in the gasoline. The two layers are allowed to separate and the resinous materials then may be recovered from the separated layers in any suitable manner.

The substantially completely gasoline-insoluble fraction is, in general, defined by the following characteristics: Substantial insolubility in petroleum hydrocarbons, the insolubility being of the order of at least 80%, substantially complete solubility in alcohol, a methoxy content of from about 3% to about 7%, an acid number of from about 80 to about 110, a melting point by the Hercules drop method of from about 95° C. to about 125° C., a saponification number of from about 135 to about 145, and a noncarboxylic hydroxyl content of from about 5% to about 9%. A typical specimen had the following characteristics: Drop melting point, 115° C.; acid number, 93; gasoline-insoluble matter, 88%; toluene-insoluble matter, 80%; saponification number, 140; ash content, 0.02%.

In general the pine wood resins employed in carrying out the present invention and which are typified by the dark-colored intermediate fraction of color bodies referred to at length above and the substantially completely gasoline-insoluble fraction and blends thereof may be defined as the resins naturally occurring in pine wood and characterized by a gasoline-insolubility of about 30% to about 95%, an unsaponifiable content of from about 5% to about 20%, a melting point above 85° C. and preferably about 90° C., and an acid number of not over about 140.

The examples have described the use of the glyceryl and ethylene glycol esters of the pine wood resins contemplated by this invention, but other polyhydric alcohol esters of the aforementioned resins, such as those derived from diethylene glycol, triethylene glycol, propylene glycol, trimethylene glycol, tetramethylene glycol, erythritol, pentaerythritol, mannitol, and the like, may be employed.

The pine wood resins and esters thereof contemplated by this invention may be present in the final adhesive composition in amounts ranging from about 20% to about 100% based on the total solids. It is preferable, however, that from about 40% to about 50% of the total solids be the resin or esters thereof.

Although the examples have shown only the use of hide glue, other animal proteinaceous materials, such as blood, albumen glue, casein glue, fish glue, isinglass, bone glue, cartilage glue, skin glue, and the like, may be utilized. Furthermore, vegetable proteinaceous adhesives, such as those prepared from zein, soya bean protein, etc., may be used. It should be realized that in the use of the aforementioned glues and adhesives, compositions generally recognized in the art are contemplated.

The proteinaceous adhesives utilized in this invention may be present in amounts up to about 80% based on the total solids of the final adhesive composition. It is preferable, however, that the proteinaceous adhesive consists of from about 50% to about 60% of the total solids, and a particularly advantageous amount is about 55%.

In some of the examples which set forth the use of the fraction of pine wood resin contemplated by this invention the ethylene glycol ester of wood rosin has been shown as an ingredient of the adhesive composition, functioning as a plasticizer. Other materials, however, may be used in like capacity. For example, the diethylene glycol ester of rosin, the mono- and diethylene glycol esters of hydrogenated rosin, the mono- and diethylene glycol esters of disproportionated rosin, the mono- and diethylene glycol esters of the adduct of maleic anhydride and the methyl ester of rosin, the mono-, di-, and triethylene glycol esters of the adduct of maleic anhydride and terpene hydrocarbons, ester gums, dibutyl phthalate, castor oil, and the like, may be used. Whenever plasticizers such as those listed above are used to modify the adhesives of this invention, the amount of plasticizer may be in amounts up to about 20% of the resin content.

All of the examples show the application of a top coat of the adhesive composition to the abrasive product which has been formed by coating cloth with the adhesive composition, spreading on abrasive particles, and drying. The emulsion of the adhesive composition used as a top coat will generally be more dilute than the emulsion used in applying the main coating. The latter emulsion preferably has a total solids content of about 40%, but the top coat emulsion may range from about 9% to about 32% total solids, and from about 20% to about 25% total solids will be particularly advantageous.

The operable temperature for the application of the adhesive emulsions of this invention will be in the range of from about 50° C. to about 70° C., although the preferred temperature will be about 55° C. While the top coat adhesive will preferably be applied at about 55° C., it may be applied, because of its dilute nature, at temperatures ranging from about 20° C. to about 70° C.

In the preparation of emery cloth Example 1 has described the cloth base as being twenty-eight inches wide and previously sized with a 10% aqueous solution of hide glue. The purpose of the glue sizing is to prevent penetration of the principal adhesive below the surface of the cloth. In place of the 10% hide glue solution ordinarily employed in sizing cloth to be utilized in emery cloth manufacture the adhesive compositions of this invention may be used. By so doing a very satisfactory emery cloth base may be prepared which does not permit penetration of the main adhesive coating, and which is more advantageous than ordinary glue size in that the sized emery cloth base is less sticky in warm or humid weather. For sizing purposes the adhesive compositions of this invention may be applied as emulsions having from about 5% to about 20% total solids, and a value of about 10% total solids will be particularly advantageous. Depending upon the viscosity of the adhesive emulsion, the latter may be applied at a temperature of about 20° C. to about 55° C., using sizing procedures well known in the art, and the product dried at a temperature of about 100° C. to about 120° C.

The sheet abrasive products prepared in accordance with this invention present advantages over the prior art products. Sandpaper or emery cloth prepared in accordance with the present processes have been shown to exhibit a definite improvement in the tendency to "gum up" under conditions of actual use, consequently, they may be used longer than the prior art products. These novel sheet abrasive products are also interesting inasmuch as they provide superior water and oil resistance as compared with prior art products and have excellent resistance to decomposition with age. Furthermore, since the cost per pound of the resin emulsions described herein is considerably less than that of aqueous 50% glue solutions per pound, the cost of the improved adhesive compositions of this invention is a great deal lower than when glue alone is used.

What I claim and desire to protect by Letters Patent is:

1. An abrasive product comprising a backing of a cellulosic sheet material, a coating thereon comprising a proteinaceous adhesive and a material selected from the group consisting of a pine wood resin having a petroleum hydrocarbon insolubility of from about 30% to about 95% and a polyhydric alcohol ester of said resin, and abrasive grains embedded in said coating.

2. An abrasive product comprising a backing of a cellulosic sheet material, a coating thereon comprising a proteinaceous adhesive and from about 20% to about 50% by weight based on the total solids present in the coating of a material selected from the group consisting of a pine wood resin having a petroleum hydrocarbon insolubility of from about 30% to about 95% and a polyhydric alcohol ester of said resin, and abrasive grains embedded in said coating.

3. An abrasive product comprising a backing of a cellulosic sheet material, a coating thereon comprising a proteinaceous adhesive and from about 40% to about 50% by weight based on the total solids present in the coating of a material selected from the group consisting of a pine wood resin having a petroleum hydrocarbon insolubility of from about 30% to about 95% and a polyhydric alcohol ester of said resin, and abrasive grains embedded in said coating.

4. An abrasive product comprising a backing of a cellulosic sheet material, a coating thereon comprising a proteinaceous adhesive and a pine wood resin having a petroleum hydrocarbon insolubility of from about 30% to about 95%, and abrasive grains embedded in said coating.

5. An abrasive product comprising a backing of a cellulosic sheet material, a coating thereon comprising a proteinaceous adhesive and a polyhydric alcohol ester of a pine wood resin having a petroleum hydrocarbon insolubility of from about 30% to about 95%, and abrasive grains embedded in said coating.

6. An abrasive product comprising a backing of a cellulosic sheet material, a coating thereon comprising an animal proteinaceous adhesive and a pine wood resin having a petroleum hydrocarbon insolubility of from about 30% to about 95%, and abrasive grains embedded in said coating.

7. An abrasive product comprising a backing of a cellulosic sheet material, a coating thereon comprising animal glue and a pine wood resin having a petroleum hydrocarbon insolubility of from about 30% to about 95%, and abrasive grains embedded in said coating.

8. As a new article of manufacture, sandpaper comprising a paper backing, a coating thereon comprising animal glue and a pine wood resin having a petroleum hydrocarbon insolubility of from about 30% to about 95%, and abrasive grains embedded in said coating.

9. An abrasive product comprising a backing of a cellulosic sheet material, a coating thereon comprising a proteinaceous adhesive and a pine wood resin having a petroleum hydrocarbon insolubility of from about 80% to about 95%, and abrasive grains embedded in said coating.

10. An abrasive product comprising a backing of a cellulosic sheet material, a coating thereon comprising an animal proteinaceous adhesive and a pine wood resin having a petroleum hydrocarbon insolubility of from about 80% to about 95%, and abrasive grains embedded in said coating.

11. An abrasive product comprising a backing of a cellulosic sheet material, a coating thereon comprising animal glue and a pine wood resin having a petroleum hydrocarbon insolubility of from about 80% to about 95%, and abrasive grains embedded in said coating.

12. As a new article of manufacture, emery cloth comprising a cloth backing, a coating thereon comprising animal glue and a pine wood resin having a petroleum hydrocarbon insolubility of from about 80% to about 95%, and abrasive grains embedded in said coating.

13. An abrasive product comprising a backing of a cellulosic sheet material, a coating thereon comprising a proteinaceous adhesive and the glyceryl ester of a pine wood resin having a petroleum hydrocarbon insolubility of from about 30% to about 95%, and abrasive grains embedded in said coating.

14. An abrasive product comprising a backing of a cellulosic sheet material, a coating thereon comprising a proteinaceous adhesive and the ethylene glycol ester of a pine wood resin having a petroleum hydrocarbon insolubility of from about 30% to about 95%, and abrasive grains embedded in said coating.

ALLEN C. BARWELL.

REFERENCES CITED

The following references are of record in the file of this patent:

UNITED STATES PATENTS

| Number | Name | Date |
|---|---|---|
| 172,162 | Peabody | Jan. 11, 1876 |
| 1,468,960 | Crupi | Sept. 25, 1923 |
| 2,127,298 | Isaacs | Aug. 16, 1938 |
| 2,325,172 | Borglin | July 27, 1943 |